Nov. 1, 1927.

E. S. CROCKER 1,647,437

FOUR-WHEEL TRUCK FOR MOTOR VEHICLES

Filed Jan. 16, 1926

INVENTOR,
Elmer S. Crocker
BY
ATTORNEY.

Patented Nov. 1, 1927.

1,647,437

UNITED STATES PATENT OFFICE.

ELMER S. CROCKER, OF LOS ANGELES, CALIFORNIA, ASSIGNOR TO OLIVE R. FULLER, OF LOS ANGELES, CALIFORNIA.

FOUR-WHEEL TRUCK FOR MOTOR VEHICLES.

Application filed January 16, 1926. Serial No. 81,630.

My invention relates to motor-vehicle construction and more particularly to a truck device for use on six-wheel motor vehicles, designed for heavy traffic.

The primary object of my invention is to provide a four-wheel truck for use on six-wheel motor vehicles, to carry the rear end thereof, whereby the vehicle load is so distributed as to cause a minimum of wear on streets and roadways so that the capacity of such vehicle may be increased without damaging the pavements.

A further object is to provide a four-wheel truck of the character described which will carry the vehicle load in such a manner as to cause relatively smooth riding thereof over rough roads, thus reducing breakage and wear on the vehicle parts and prolonging the life of the vehicle besides reducing damage to goods in transit.

A still further object is to provide a truck device for six-wheel motor vehicles which will carry the vehicle load in such a manner that the lifting or lowering of any wheel, in passing over uneven roads, does not change appreciably the proportion of weight carried by the other wheels.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

Referring to the drawings which accompany this specification and form a part thereof, Fig. 1, is a side view of the rear end of a motor vehicle supported by a four-wheel truck embodying the features of my invention.

Figure 1:
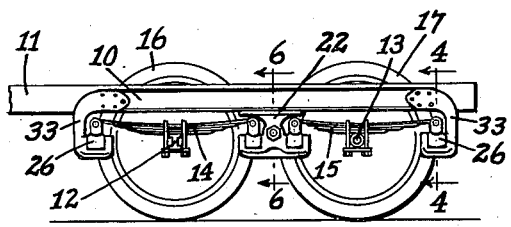
Figure 2:
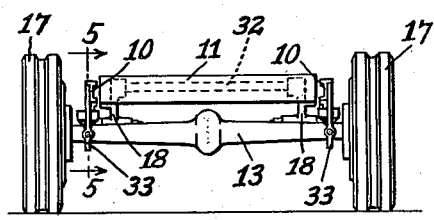
Fig. 2, is a rear view of the motor vehicle and truck shown in Fig. 1.
Figure 4:
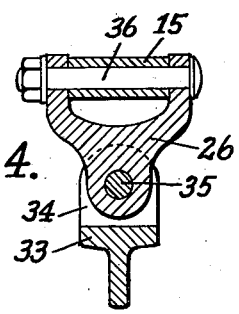
Fig. 4, is an enlarged sectional view, taken on line 4—4 of Fig. 1, showing details of a shackle and pin used on my truck.
Figure 6:
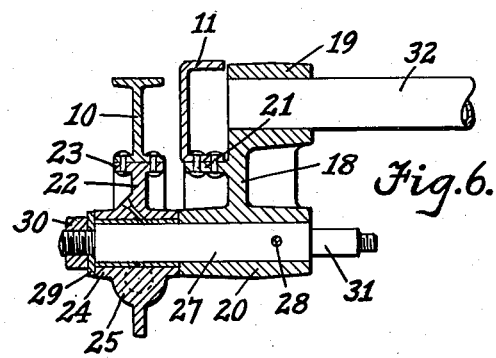
Fig. 6, is an enlarged sectional view of rocker parts and one side of the vehicle frame, taken on line 6—6 of Fig. 1 and showing details of construction.

Considering the drawings more in detail and in connection with the reference numerals, it will be seen that the truck consists of two side-beams or rocker-arms 10 extending along the outer sides of the vehicle frame 11, parallel to them and in slightly spaced relation to them, means for pivotally attaching said rocker-arms to the vehicle frame at approximately their middle points, a front axle 12 and a rear axle 13 extending transversely between said rocker-arms, in parallel spaced relation to each other, front springs 14 and rear springs 15 resting on said axles 12 and 13 respectively, means for attaching the ends of said springs to said rocker-arms 10, and wheels 16 and 17 mounted on said front and rear axles respectively.

The means employed for pivotally attaching rocker-arms 10 to vehicle frame 11 are an inner bracket 18 provided with an upper bearing 19, a lower bearing 20 and a lateral flange 21, adapted to be attached to the under side of the vehicle frame so as to support the rear end thereof, and an outer bracket 22 provided with an upper flange 23 by which it is fastened to the under side of rocker-arm 10, a transverse central bearing 24, coinciding with bearing 20 of bracket 18 in size and axial alignment, and a series of aligned longitudinal bearings 25 spaced so as to receive shackles 26, the means by which the springs are connected to the outer bracket. A pivot shaft 27 extends through bearings 20 and 24 of brackets 18 and 22, respectively, and is fixed in bracket 18 by a pin 28 extending through the shaft and bearing 20, while bearing 24 is turnably held on the shaft by a washer 29 and a nut 30 on its outer end. The inner end of pivot shaft 27 is reduced as at 31 to receive a lever arm (not shown) for operating the brake. A connecting bar or tube 32, extending between brackets 18, on opposite sides of the frame has its ends fixed in bearings 19.

Downwardly extending brackets 33 having spaced bearings 34, in alignment with said bearings 25, which are also adapted to receive shackles 26 are fixed on the ends of rocker-arms 10. Pivot pins 35 extend through bearings 25 and 34 and the lower ends of shackles 26. The upper ends of shackles 26 are forked to span the end loops of springs 14 and 15 and pivot bolts 36 extend therethrough in the usual way. This arrangement prevents any twisting stress in the springs due to uneven distribution of the load. The loop on one end of each spring is elongated as at 37 to provide for the necessary slip due to the lengthening and shortening of the springs caused by variations in the load.

It will be observed that the front and rear axles are shown unequally spaced from the pivot shaft, the distance of the former being somewhat greater than that of the latter. The object of this arrangement is to provide ample traction and braking on the rear wheels of the truck, it being understood that the vehicle is to be driven through the two rear wheels only. The front axle of the truck, therefore, may be provided with steering knuckles like the front axle of the vehicle and may be connected to the steering mechanism thereof by a rod and lever (not shown) which will cause the front wheels of the truck to turn in such proportion to the front wheels of the vehicle that the vehicle as a whole may be turned on a center of relatively small radius without excessive wear on the tires or excessive gas consumption.

Figure 3:
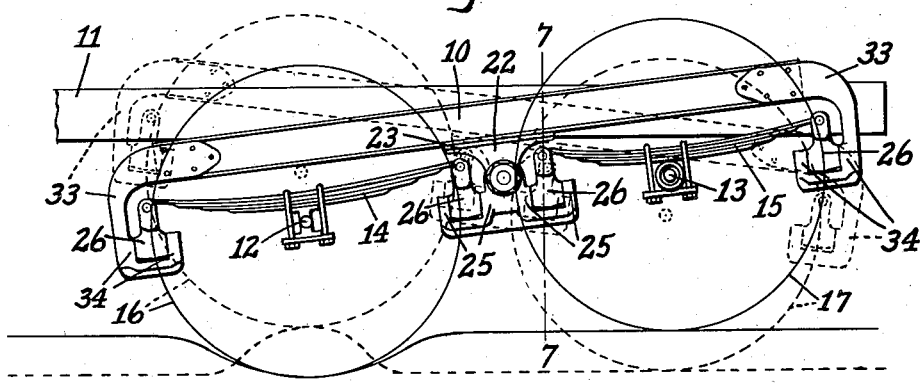
Fig. 3, is an enlarged view, partly in diagram, of the vehicle and truck parts shown in Fig. 1, illustrating the operation of the truck when passing over rough ground.
Figure 5:
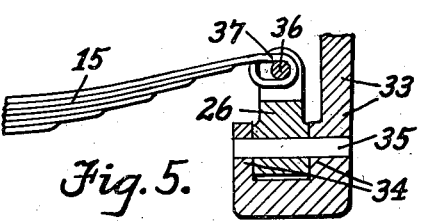
Fig. 5, is an enlarged sectional view, taken on line 5—5 of Fig. 2, showing details of a shackle and pin, at right angles to the view shown in Fig. 4.

This arrangement also brings the pivot shaft in such proximity to the universal joint, the position of which is indicated approximately by line 7—7 in Fig. 3, that a very small movement of the joint results, in consequence of which there is relatively little wear therein. Furthermore, because of the small amount of angularity, the slip in the joint is small.

The action of my four-wheel truck is illustrated in Fig. 3. As shown in full lines, when the front wheel of the truck drops into a depression in the road through a given distance pivot shaft 27 and therefore the frame 11 and load falls less than half the distance. When the rear truck wheel drops into the depression, however, the frame and load drop slightly more than half the distance. In short, the effect of the truck in such a case is to produce two slight drops of the load the sum of whose distances is equal to the depth of the depression or the full drop of each of the two wheels. A similar action will take place when an elevation or hump is encountered which lifts one of the wheels above the road level, as shown in dotted lines. It is evident, therefore, that the action of the truck in traveling over rough roads is such as to greatly reduce the jolting of the load and the consequent wear on the roadway.

Having thus illustrated and described my invention, I claim:

A four-wheel truck for motor vehicles comprising two rigid rocker arms, one on each side of the vehicle, inner brackets adapted to be fixed to the side bars of the vehicle frame, bearings on said brackets, said bearings being vertically beneath said side bars, outer brackets fixed on said rocker arms near the mid-length thereof, bearings on said outer brackets in alignment with said bearings in the inner brackets, a pivot shaft extending through said bearings on said inner and outer brackets, so as to hold said brackets in pivoted relation to each other, a vehicle spring to which each end of said rocking member is connected, and a connecting bar to maintain said inner brackets in fixed relation to each other.

ELMER S. CROCKER.